March 9, 1926.
G. P. EVANS
SPEED CONTROL
Filed May 2, 1924
1,575,676
2 Sheets-Sheet 1
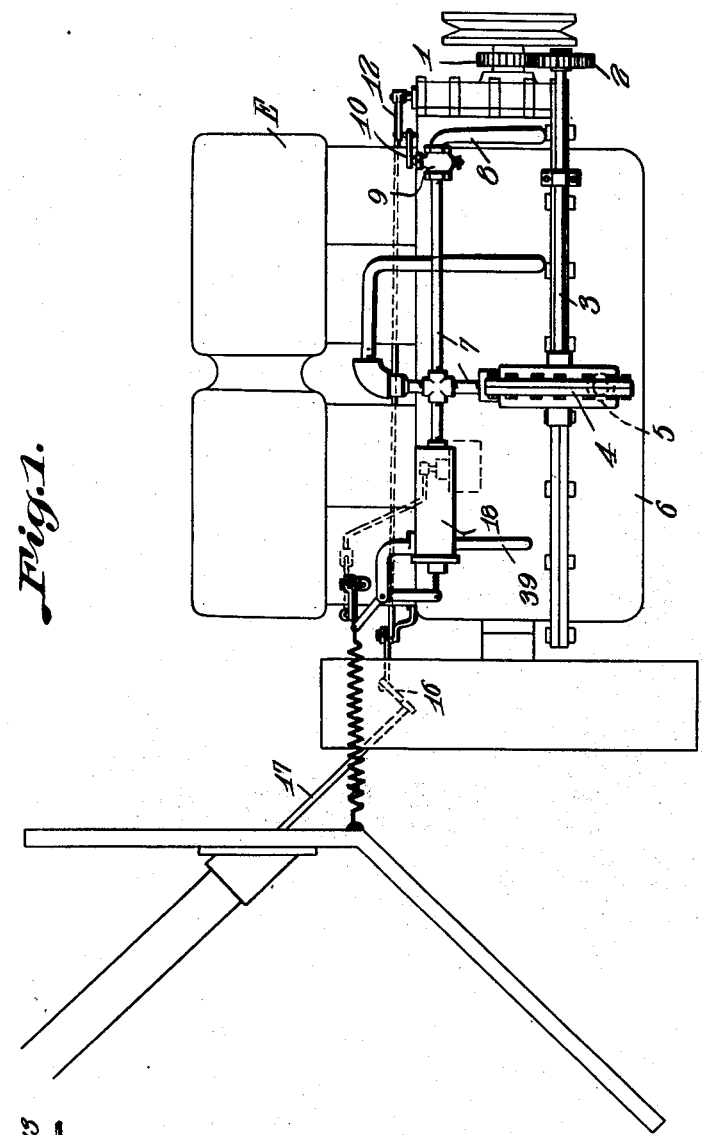
Fig. 1.
Fig. 3.
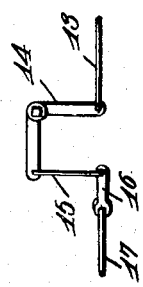
G. P. Evans, Inventor
By C. A. Snow & Co.
Attorneys

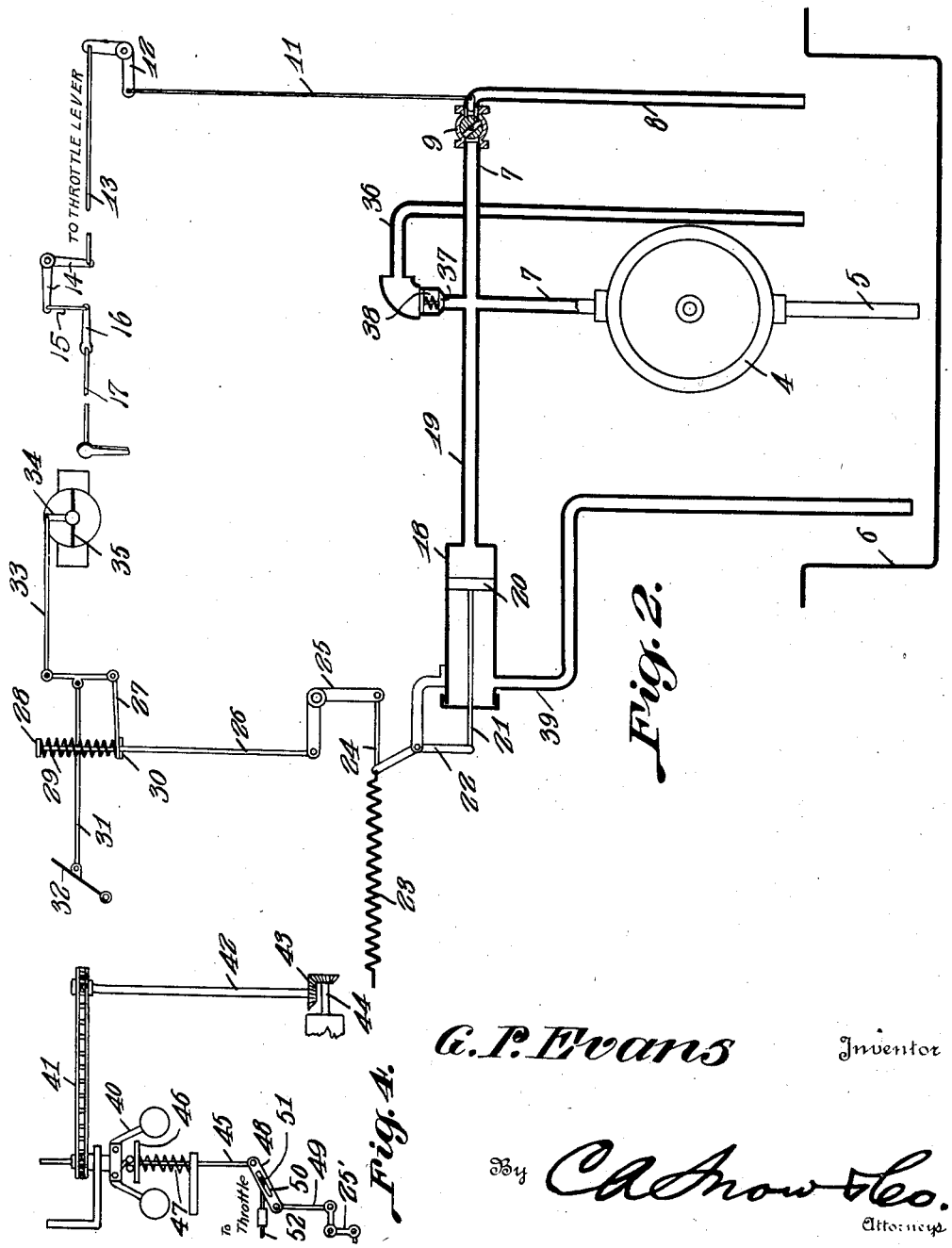

Patented Mar. 9, 1926.

1,575,676

UNITED STATES PATENT OFFICE.

GEORGE P. EVANS, OF YORK, PENNSYLVANIA.

SPEED CONTROL.

Application filed May 2, 1924. Serial No. 710,590.

*To all whom it may concern:*

Be it known that I, GEORGE P. EVANS, a citizen of the United States, residing at York, in the county of York and State of Pennsylvania, have invented a new and useful Speed Control, of which the following is a specification.

This invention relates to apparatus for use in controlling the speed of an engine and while it is designed primarily for use in connection with vehicles propelled by internal combustion engines, it is to be understood that it can also be used for controlling other types of engines whether or not associated with a vehicle.

One of the objects of the present invention is utilize pressure operated means whereby the engine will be partly or entirely throttled as the speed of the engine reaches and passes a predetermined degree, it being possible readily to set the mechanism to automatically maintain the engine at any predetermined speed.

A further object is to provide speed controlling means which will not prevent acceleration whenever it is desired momentarily to drive the engine in excess of the established speed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a side elevation of an automobile motor having the present improvements combined therewith.

Fig. 2 is a view showing in diagram, the complete apparatus.

Fig. 3 is a plan view of the connection with the throttle stem.

Fig. 4 is a view showing, in diagram, a modified speed control mechanism.

Referring to the figures by characters of reference E designates an engine of the usual or any preferred type having any suitable means, such as meshing gears 1 and 2 for driving the shaft 3 of a pump 4. This pump has an intake 5 communicating with the oil pan 6 of the engine so that, during the actuation of the pump, oil will be withdrawn thereby and expelled through a pipe 7 to a return pipe 8 which serves to direct the oil back into the pan. A valve 9 is arranged within the pipe 7 and the arm 10 of this valve is connected by a rod 11 to one arm of a bell crank 12. The other arm of the bell crank is connected by a rod 13 to a bell crank 14 which, in turn, is connected by a link 15 to a crank arm 16 extending from the stem 17 of the usual throttle lever (not shown) mounted on the steering wheel of the vehicle.

A cylinder 18 is located adjacent the pump and one end of the cylinder, communicates, through a pipe 19, with the pipe 7. In this cylinder is mounted a piston 20, the stem 21 of which is connected to one arm of a bell crank 22. A spring 23 is attached to the other arm of this bell crank and is normally under tension so as to hold the piston 20 normally pressed toward the pipe 19. The spring engaged arm of bell crank 22 is connected by a link 24 to one arm of another bell crank 25, the other arm of which has a rod 26 extending from it. This rod slidably engages one arm of another bell crank 27. A head 28 is provided on the rod and a spring 29 is interposed between this head and the bell crank. A stop pin 30 or the like is carried by the rod 26 and constitutes a thrust bearing for bell crank 27.

The other arm of bell crank 27 is connected by a link 31 to the accelerator pedal 32 and is also connected by a link 33 to the arm 34 of the butterfly valve 35 commonly employed for controlling the flow of gas to the engine.

A supplemental return pipe 36 extends from the pipe 7 and opens into the pan 6, this return pipe being provided with a relief valve 37 normally held to its seat by a spring 38, this spring being slightly stronger than the spring 23.

As the pump is directly geared to the engine the speed of rotation of the pump will increase and diminish with the speed of the engine. The pipes 7 and 8 are so proportioned that when the engine and pump are running at maximum speed the lifted oil will flow freely through the outlet pipe 7 and the return pipe 8 back to the pan 6. When it is desired to limit the normal speed of the engine the throttle valve 9 is shifted by means of the throttle lever so as to partly close the valve. When the speed of the pump becomes such that the amount of oil lifted thereby cannot pass through the partly closed valve 9 the oil will set up a back pressure within the cylinder 18 and cause piston 20 to shift against the action of spring 23. At the same time rod 26 will pull through spring 29 upon bell crank 27 and cause the butterfly valve 35 to partly close. Thus the speed of the engine will be promptly cut down and, obviously, by manipulating the throttle lever the driver can readily set the mechanism so that the normal speed of the engine can be the speed desired. Should the engine be operating as a result of coasting or should it be desired suddenly to reduce the speed of the engine from maximum to a much lower rate, the piston 20 would sometimes reach the limit of its movement under the back pressure before the speed of the engine is brought down to the predetermined rate. Under these circumstances there would be an excess of back pressure. This would be relieved by the opening of valve 37 allowing the excess pressure to escape by way of pipe 36 back to the pan 6.

At any time during the operation of the engine the driver, by pressing on the foot pedal 32 can shift bell crank 27 against the action of spring 29 and thus open the butterfly to accelerate the engine. It will be seen, therefore, that even though the apparatus should be set to maintain the engine at a reduced normal speed the driver, when desired, can speed up the engine simply by pressing on the pedal 32.

Importance is attached to the fact that the present invention provides a means whereby the driver, without leaving his seat, can vary the maximum speed at which the motor will operate under normal conditions.

For the purpose of allowing drainage from back of the piston 20 a drain pipe 39 is preferably extended from cylinder 18 to the pan 6.

Although it is preferred to utilize oil pressure as a means for operating the speed control mechanism, as heretofore explained, it is to be understood that a governor properly coupled to the engine can also be used instead of a pressure operated piston and a pump. Such a modification has been illustrated in Fig. 4 wherein a centrifugal governor 40 has been shown connected by a suitable chain and sprocket mechanism 41 to a shaft 42 adapted to receive motion through gears 43 from an engine shaft 44 or any other shaft receiving motion from the engine. A rod 45 is slidably mounted relative to the governor 40 and carries a table 46 which is yieldingly supported by a spring 47. This rod is connected to one end of a lever 48, the other end of which is connected, by a rod 49, to one arm of a bell crank 25' corresponding with the bell crank 25 hereinbefore described. Lever 48 has a longitudinal slot 50 in which is mounted a shiftable fulcrum 51 adapted to be given right line movement by a rod 52 connected to the throttle, not shown.

It will be obvious that when the engine attains a predetermined speed the balls of governor 40 will be moved outwardly by centrifugal force and the arms of the governor will press against the table 46 and thus thrust rod 45 longitudinally. Consequently lever 48 will be rocked and motion will be transmitted to bell crank 25' and to the butterfly. By shifting the fulcrum of lever 48 the speed of the governor necessary to operate the bell crank can be varied. Thus the operation of the engine will be controlled as efficiently as where a pump and a fluid operated piston are used.

What is claimed is:—

The combination with an engine and a valve for controlling the supply of fuel thereto, of a pump operating with the engine, means cooperating with the pump and including a receptacle and intake and return pipes communicating with the receptacle, for maintaining a circulation of fluid during the operation of the engine, a valve in the return pipe of said means, means for connecting said valve to the throttle lever of the engine for retarding the circulation of fluid through the pipe, thereby to set up a back pressure, a supplemental return pipe, a normally closed valve therein adapted to open when subjected to excessive pressure from within the return pipe, a cylinder in communication with the return pipe, a piston mounted therein for movement under back pressure, a drain pipe extending from the cylinder back of the piston, yielding means for holding the piston normally in one position against the action of back pressure, and a working connection between said piston and the fuel controlling valve, said connection including means for yieldingly resisting relative movement of the piston and the fuel controlling valve, said valve being shiftable independently of the pressure operated means to accelerate the engine above normal speed determined by the pressure operated means.

In testimony that I claim the foregoing as my own, I have hereto affixed my signature.

GEORGE P. EVANS.